NEGATIVE RESISTANCE SEMICONDUCTIVE DEVICE

Filed Feb. 21, 1961

INVENTOR
C. A. LEE
BY
Arthur J. Torsiglieri
ATTORNEY

United States Patent Office 3,054,972

Patented Sept. 18, 1962

3,054,972

NEGATIVE RESISTANCE SEMICONDUCTIVE DEVICE

Charles A. Lee, New Providence, N.J., assignor to Bell Telephone Laboratories, Incorporated, New York, N.Y., a corporation of New York Filed Feb. 21, 1961, Ser. No. 90,781

5 Claims. (Cl. 331—115)

Figure 1:
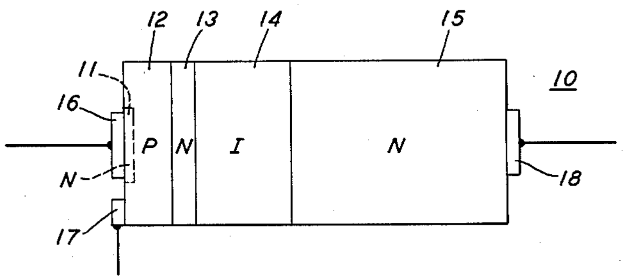

This invention relates to semiconductive devices and more particularly to a semiconductive device capable of providing a negative resistance at very high frequencies.

Various semiconductive devices are known which are capable of providing a negative resistance at very high frequencies but such devices typically are of limited usefulness because of their low power-handling capabilities.

One of the more promising forms of semiconductive devices free of this limitation is the transit time negative resistance semiconductive device described in United States Patent 2,899,646, which issued on August 11, 1959, to W. T. Read. This device comprises a semiconductive diode of appropriate design which by means of an applied bias is subjected to an electric field of sufficient magnitude to generate by electrical breakdown hole-electron pairs at a localized region of the diode. The carriers generated by this field are caused to flow across a space charge layer in the diode and by virtue of this movement they produce a current in an associated external circuit. The diode is designed so that the width of the space charge layer remains substantially fixed and the operating bias is such that in such layer the charge carrier velocity is substantially independent of fluctuations in the field intensity, whereby the charge carrier transit time is substantially independent of fluctuations in the field intensity. The diode is further operated so that there is superimposed on the operating bias an alternating voltage of a frequency which is appropriately raised to the transit time of charge carriers across the space charge layer. Typically, the alternating voltage is provided by housing the semiconductive diode in a resonant cavity tuned to the desired frequency.

In an illustrative embodiment of such a device there is employed a semiconductive element which includes a relatively weakly doped intermediate region which is bounded at opposite ends by highly doped end regions of opposite conductivity types. Typical is an NPIP structure where the designation is the one familiar to workers in the art. Across the ends zones there is applied a reverse bias which forms a space charge region of the intermediate P and I zones. The electric field has a maximum at the NP edge of this space charge layer. The magnitude of the bias is adjusted to make the maximum electrical field close to that needed for electrical breakdown. Additionally, the magnitude of the alternating component superimposed on the steady bias is such that when it is at a peak in a direction to add to the steady bias, the desired electrical breakdown occurs. The field distribution in the element is also adjusted so that the field in the main portion of the space charge layer is sufficiently high that the carriers drift therethrough at a substantially uniform velocity. The flow of carriers in the space charge region gives rise to an external current. By appropriate control of the transit time of the carriers through the space charge layer, there can be introduced a desired phase relation between the alternating voltage sperimposed on the applied bias and the resulting alternating current in an external circuit. In particular, the element is made to present a dynamic negative resistance at frequencies at which an appropriate phase relation exists.

Among the difficulties that have developed in devices of the kind described is the tendency for the breakdown to occur as discrete microplasmas rather than uniformly at the edge of the space charge layer where the electrical field is a maximum. As a result, it has been difficult to realize the full potential of such devices.

An object of the invention is to reduce this tendency in such devices and thereby to provide an improved device.

To this end, a feature of the invention is the provision in a device of the kind described of a uniform current of injected carriers at the edge of the charge space layer where the electrical field is a maximum. Such a current serves to insure uniform breakdown and a concomitant rise in efficiency. Such a current is achieved by introducing an additional zone in the semiconductive element from which such current can be ejected.

An illustrative embodiment of the invention comprises a semiconductive element having an NPNIN structure and separate electrode connections to the end N-type zones and the P-type zone. Voltages are applied to forward bias the NP junction and to reverse bias the PN junction whereby a flow of electrons is provided to the reverse-biased PN junction. The magnitude of the reverse bias is adjusted to provide an electric field at the edge of the space charge layer associated with the PN junction close to that needed for electrical breakdown such that when an alternating component is superimposed on the steady bias the desired electrical breakdown occurs periodically at the frequency of such component. Moreover, the element is further designed so that the transit time of the charge carriers through the space charge layer formed in the element is such as to introduce an appropriate phase relationship between the alternating voltage superimposed on the steady bias and the resulting alternating current in the external circuit whereby a dynamic negative resistance is provided in the external circuit.

Figure 2:
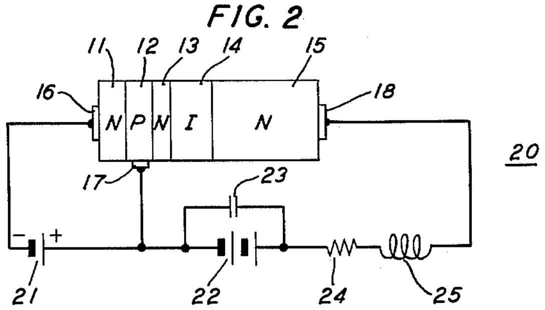
Figure 3:
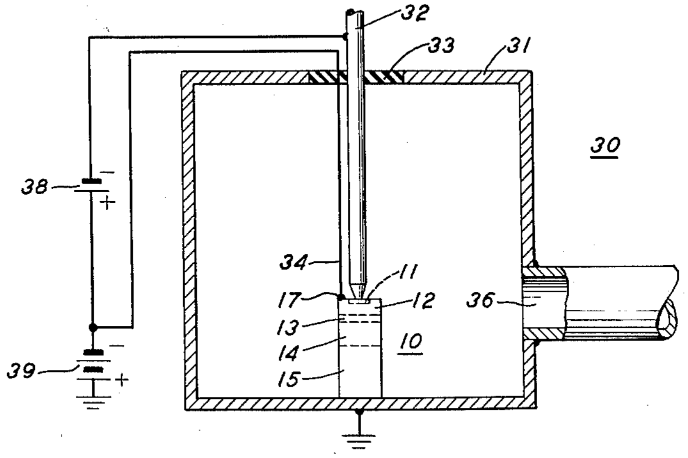

The invention will be better understood from the following more detailed description taken in conjunction with the accompanying drawing in which:

FIG. 1 illustrates schematically a five zone semiconductive element of the kind useful in the invention; and FIGS. 2 and 3 show, respectively, a video frequency oscillator and a microwave oscillator utilizing the invention as a negative resistance element.

With reference now to the drawing, in FIG. 1 the element 10 of any suitable semiconductor material, such as silicon or germanium, comprises zones 11 through 15 to provide an NPNIN structure. Electrodes 16, 17 and 18 make low resistance connections to zones 11, 12 and 15, respectively.

As is discussed more fully in the aforementioned Read patent, two criteria should be met in operation. The electric field should be so distributed in the element that hole-electron pairs are generated in a limited region of the space charge layer and the charge carriers should move through the space charge region with an average transit time such that the integrated voltage current product is negative.

The first criterion is met by providing an appropriate distribution of impurities in the element such that the maximum electric field is reached only in a limited region of the space charge layer at the edge of the PN junction.

The second criterion is met by providing a phase difference of between $\pi$ and $2\pi$ radians between the alternating voltage component and the resulting current in the external circuit. The desired phase shift is achieved by appropriate design of the width of the space charge layer to control the average transit time.

In addition to the transit time of the carriers through the space charge layer, the amount of phase shift is affected by any build-up time in the generation of the current. In the case where the breakdown is the result of internal secondary emission, the type of breakdown usual in silicon, the build-up time introduces a phase delay of about a quarter of a cycle ($\pi/2$ radian) between the initiating alternating voltage and the resulting alternating current. Accordingly, in such a device, the width of the space charge layer is designed to introduce between $\pi/2$ and $3\pi/2$ radian of phase shift. In the case where the breakdown is the result of internal field emission, the type of breakdown usual in narrow junctions in germanium, there is no appreciable build-up time and hence no appreciable phase lag introduced between the initiating alternating voltage and the resulting current. In such device, the desired phase shift is achieved entirely by the transit time experienced in the space charge layer.

A typical design useful for operation at about five hundred megacycles in which the element is monocrystalline silicon and the breakdown is the result of internal secondary emission has the following characteristics. The cross section is about 10 mils square. The thickness (the dimension parallel to the direction of current flow between the two end zones) of zones 11 and 15 is not material. Their thicknesses should be sufficient to provide an over-all thickness adequate for convenient handling. The thickness of layer 14, which primarily fixes the length of the drift region for the carriers, is fixed by the operating frequency intended. For operation at five hundred megacyclces a thickness of about $10^{-2}$ centimeters is appropriate. For operation at higher frequencies, the thickness would need to be scaled down a proportional amount. For example, for operating at five thousand megacycles, a thickness of about $10^{-3}$ centimeters would be called for. Layers 12 and 13 may each typically be about $10^{-4}$ centimeters thick. Layers 11 and 15 should be heavily doped, for example, to have a predominant impurity level between $10^{18}$ and $10^{19}$ atoms per cubic centimeter. Intrinsic or high resistivity layer 14 should have an impurity concentration not significantly greater than $10^{13}$ atoms per cubic centimeter. It is relatively immaterial whether the region be slightly N- or p-type, although fabrication may be simplified by making the predominant impurity a donor. In general, the specific resistivity of the material forming zone 14 should be at least a hundred times that of the other zones. Zone 13 should include a total number of donors ranging between $10^{11}$ and $10^{12}$ atoms per square centimeter of cross section, corresponding to an average concentration of between $10^{15}$ and $10^{16}$ atoms per cubic centimeter. Layer 12 should include a total number of acceptors ranging between $10^{12}$ tnd $10^{14}$ atoms per square centimeter of cross section, corresponding to an average concentration of between $10^{16}$ and $10^{18}$ atoms per cubic centimeter.

Various techniques will be known to a worker in the art for constructing such an element. Typically, the IN junction can be formed during the crystal pulling process, the NI and PN junctions by successive diffusion steps and the NP junction by a final alloying step. The electrodes 16, 17 and 18 would be conventional. As shown, zone 11 extends only partially across the full cross section of the element, leaving exposed an N-type surface region where electrode 17 can be connected. Alternatively, electrode 17 by appropriate doping with an acceptor can be permitted to bridge over the NP and PN junctions without deleterious effect, in the manner used to make the base connection in rate-grown junction transistors.

In operation, a voltage source is connected between electrodes 16 and 17 poled to bias the NP junction in the forward direction for the injection of electrons from zone 11 into zone 12 for diffusion thereacross to the PN junction. This junction is biased in reverse to just about breakdown by means of a voltage source appropriately poled connected between electrodes 17 and 18. Also between electrodes 17 and 18 there would be connected a source of a signal of appropriate frequency. Such a source in the case of an oscillator would simply be a circuit resonant at the appropriate frequency, noise in such circuit providing the alternating voltage necessary periodically to initiate breakdown of the PN junction.

There is shown in FIG. 2 an oscillator of the kind just described designed for frequencies where lumped circuit elements can be used. The oscillator 20 includes element 10 of the kind described, voltage source 21 connected between electrodes 16 and 17 to forward bias the NP junction, an output circuit connected between electrodes 17 and 18 including voltage source 22 to reverse bias the PN junction, a capacitor 23 by-passing the voltage source for alternating voltages, a load 24, and an inductive element 25 designed to resonate with the capacitance of the circuit at the frequency desired for oscillations.

In FIG. 3 there is shown an oscillator 30 designed for operation at frequencies where a microwave cavity serves advantageously as the resonant element. It comprises the semiconductive element 10 mounted within the tunable cavity 31 to have zone 15 contacting a central portion of wall of the cavity and making a low resistance connection therewith. The cavity advantageously is grounded. Zone 11 of the wafer makes a low resistance connection to conductive post 32 extending through the opposite wall of the cavity. The post is isolated for direct current from the cavity wall by insulating bushing 33. However, post 32 is effectively connected to the cavity wall for radio frequency currents. The post is tapered at the end contacting the semiconductive element to reduce capacitive effects. The cavity is provided with tuning means (not shown) of conventional design by means of which the cavity can be tuned for operation at the design frequency. In particular, the cavity is designed to function as an inductance tuned with the capacitance of the semiconductive element and any stray capacitance for resonance at the design frequency. Lead 34, connected to zone 13, also extends through the top wall of the cavity by way of an insulating bushing which provides direct-current isolation of the lead.

The cavity is further provided with a coupling aperture 36 by means of which oscillatory wave energy can be abstracted for utilization.

In operation, a direct-current voltage source 38 is connected between lead 34 and the conductive post 32 poled to forward bias the NP junction. Similarly, voltage source 39 is connected between ground and the lead 34 poled to reverse bias the junction PN an appropriate amount.

In this arrangement the negative resistance is being tapped between electrodes 16 and 18. This becomes feasible because the large capacitance associated with the forward biased NP junction, at the high frequency here involved, inserts very little extra impedance in the current path between electrodes 16 and 18 and accordingly electrode 16 is effectively connected to the P-type zone for high frequency current.

It is to be understood that the specific embodiments described are merely illustrative of the general principles of the invention.

Various modifications are feasible without departing from the spirit and scope of the invention.

In particular, the semiconductor element can have the complementary PNPIP structure. This would simply entail reversing the polarities of the applied voltages as known to workers in the art.

Moreover, the negative resistance developed can be utilized in a variety of ways. For example, the arrangement shown in FIG. 3 may be adapted for use as an amplifier by providing a circulator, the first arm of which is supplied with the signal to be amplified, the second arm of which is connected to the cavity by way of the coupling aperture, the third arm of which leads to the useful load, and the fourth arm of which is a dummy load. Arrangements of this kind for utilizing a negative resistance at microwave frequencies are well known.

Moreover, modulation of the oscillations in the oscillators described can be effected to some extent by modulation in the carriers injected across the forward biased junction.

What is claimed is:

1. A semiconductive device comprising a semiconductive element having five zones in succession, the first, third and fifth of which are of one conductivity type, the second of the opposite conductivity type and the fourth of a specific resistivity substantially higher than the other zones, and separate electrode connections to the first, second and fifth zones.

2. A semiconductive device comprising a semiconductive element having an NPNIN structure and separate electrode connections to the two end zones and the P-type zone.

3. A semiconductive device comprising a semiconductive element having a PNPIP structure and separate electrode connections to the two end zones and the N-type zone.

4. A semiconductive device in accordance with claim 1 in combination with means for biasing the junction between the first and second zones in the forward direction and means for biasing the junction between the second and third junctions in reverse.

5. A negative dynamic resistance arrangement comprising a semiconductive element having five zones in succession of which the first, third and fifth zones are of like conductivity type, the second zone is of the opposite conductivity type and the fourth zone is of substantially higher resistivity, separate electrode connections to the first, second and fifth zones, means for establishing a forward bias on the junction between the first and second zones, and means for establishing a reverse bias on the junction between said second and third zones and superimposed thereon an alternating voltage of magnitude such that periodically the electric field at the region adjacent said last-mentioned junction reaches a value sufficient for the breakdown generation of hole-electron pairs, the period of such alternating component and the transit time of the generated carriers through the third and fourth zones being so correlated that a dynamic negative resistance is established between the second and fifth zones.

No references cited.